United States Patent [19]
Dawson

[11] 3,976,204
[45] Aug. 24, 1976

[54] MECHANICAL HANDLING APPARATUS

[75] Inventor: Ronald John Dawson, Bromsgrove, England

[73] Assignee: GKN Forgings Limited, England

[22] Filed: Mar. 10, 1975

[21] Appl. No.: 557,152

[52] U.S. Cl.............................. 214/1 BB; 198/20 R; 294/104
[51] Int. Cl.². ........................................ B65G 46/06
[58] Field of Search................ 214/1 BB, 1 BT, 1 B, 214/1 BC, 1 BD; 294/104, 87 R; 198/20 R

[56] References Cited
UNITED STATES PATENTS

| 245,122 | 8/1881 | Bishop ............................ 294/104 X |
| 2,666,541 | 1/1954 | Ferrario et al...................... 214/655 |
| 3,520,393 | 7/1970 | Horning et al................ 214/1 BB X |
| 3,865,424 | 2/1975 | Jabrowski ...................... 214/1BB X |

FOREIGN PATENTS OR APPLICATIONS

| 896,172 | 5/1962 | United Kingdom............... 214/1 BB |

Primary Examiner—Frank E. Werner
Attorney, Agent, or Firm—A Yates Dowell, Jr.

[57] ABSTRACT

A mechanical handling device comprises a carriage reciprocable between a loading station and an unloading station, stationary and movable grip members on the carriage, each including two independent grip faces so arranged that there are two pairs of grip faces with each pair comprising a stationary and a movable face, and an actuator for moving the movable grip member to grip a workpiece by either one of the pairs of faces. The movable grip member may include a rotatable shaft having two arms extending in opposite directions with a jaw at the end of each arm, and the fixed grip member comprise a bar between the jaws so that rotation of the shaft in either direction brings one of the pairs of gripping faces into operation.

The device is particularly applicable to the loading and unloading of billets in relation to a circular rotary hearth furnace.

3 Claims, 5 Drawing Figures

MECHANICAL HANDLING APPARATUS

BACKGROUND TO THE INVENTION

Field of the Invention

This invention relates to mechanical handling apparatus and, in its broadest aspect, it aims to provide an improved mechanical handling device for use with any machine or plant which is operating upon workpiece and wherein from time to time it is necessary to remove a treated workpiece and replace it at the same station with a fresh untreated workpiece.

More particularly, the mechanical handling device has been developed for the purpose of handling billets which are being heated in a furnace for a forging operation and wherein the device is used for loading cold billets into the furnace and taking away hot billets which are to be used in the forging process. Hereinafter, the invention is described in more detail in relation to this use but it will be appreciated that scope for the invention is not limited to this particular application as hereinafter described but may find application for use generally in connection with the handling of workpiece in plant, machinery and other operations outside the field of forging.

For many years hitherto it has been the practice to use an indexing rotary hearth furnace with mechanical handling devices for loading and unloading relatively large billets which are to be heated in the furnace for subsequent forging operations. In plan view such rotary hearth furnace is of circular form with the billets being arranged in spaced apart relationship and radially in relation to the vertical axis of rotation of the rotary hearth and it has been customary to use two mechanical handling devices, one for loading in cold billets and the other for unloading hot billets, each of these having automatically operating gripping tongs which grip and release a billet in a manner similar to blacksmiths' tongs, these gripping tongs being mounted on power-operated carriages which travel inwardly and outwardly in a radial direction in relation to the rotary hearth, one performing the loading of cold billets and the other performing the unloading of heated billets. This requires the furnace to have two separate doors at one side of its circumference with the two machines spaced apart so that there is, in between the two doors a "dead" zone in the furnace which is not utilised.

SUMMARY OF THE INVENTION

According to a broad aspect of the invention there is provided a mechanical handling device comprising a carriage which is movable back and forth in a path between a loading station, at which an untreated workpiece is loaded into the plant, and an unloading station at which a treated workpiece is unloaded from a handling device, said carriage having fixedly mounted thereon a stationary grip member having two independent grip faces and the carriage also supporting a movable grip member having two independent grip faces so arranged in relation to the grip faces of the stationary grip member that there are provided two pairs of co-operating grip faces with a stationary grip face and a movable grip face in each pair, and means being provided to actuate the movable grip member so as to bring either one of said pairs into operative gripping relationship on a workpiece while the other of the pair is non-operative.

By applying the present invention to the particular case of a rotary hearth furnace several advantages are immediately realised and from the economic point of view only one machine is required with obvious reduced installation and maintenance costs. Also, only one door is required in the furnace, again leading to reduced cost and greater thermal efficiency in that there is less heat loss from the furnace. Also, the previously present "dead" zone between the furnace doors is eliminated with more efficient utilisation of the rotary hearth and consequently improved efficiency.

As applied to this particular case the carriage may be mounted for linear reciprocatory movement upon a suitable fixed framework and may incorporate a support tube within which is rotatably mounted a shaft with the movable grip member mounted on one end of this shaft with the fixed grip member being mounted on the support tube at the same end. The movable grip member may comprise two arms extending in opposite directions and generally at right angles to the axis of the shaft, there being provided a jaw member at the end of each arm with an inwardly presented grip face and for co-operation with these grip faces the fixed grip member may comprise a bar-like member fixed to the front end of the support tube and projecting forwardly with its axis on the medial line between the two grip faces with the side faces of this bar-like member being presented outwardly in the direction towards the faces at the ends of the two arms. With this arrangement if the shaft is turned in one direction the grip face at the end of one arm approaches in gripping relationship to the opposed grip face on the fixed grip member and conversely if the shaft is turned in the other direction the grip face of the other arm approaches its co-operating grip face on the fixed grip member. Depending therefore upon the direction of rotation of the shaft, one grip jaw on the movable grip member is operative to grip a workpiece whilst the other is inoperative.

BRIEF DESCRIPTION OF DRAWINGS

A more detailed description of this form of the invention is given hereinafter with reference to the accompanying drawings. The following embodiment is described by way of example only and it is not intended that the scope of the invention should be considered as limited to any of the details of construction referred to hereinafter.

In the accompanying drawings.

DESCRIPTION OF PREFERRED EMBODIMENT

Figure 1:
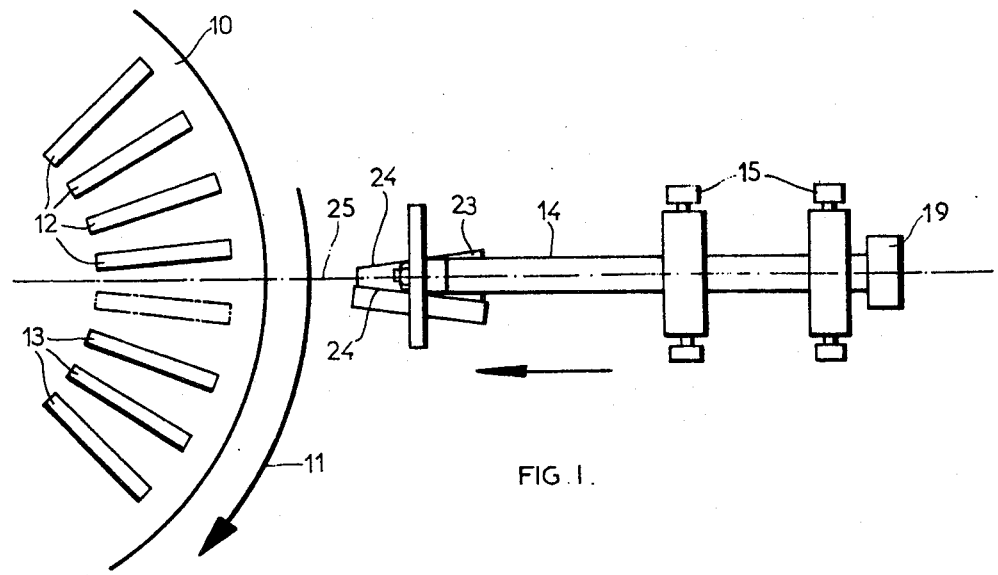
FIG. 1 is a diagrammatic sketch in plan view showing the handling device in association with the rotary hearth furnace.

Referring first to FIGS. 1, 2 and 3, 10 indicates part of the hearth of a rotary hearth furnace which, in operation, is indexed with an intermittent step-by-step motion in the direction of the arrow 11 and reference numeral 12 indicates a number of already heated billets which are completing a circuit of the furnace. Reference numeral 13 indicates cold billets which have just entered the furnace.

Figure 2:
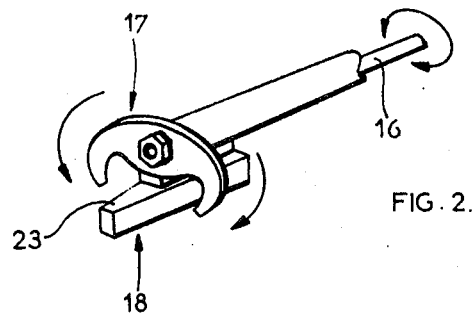
FIG. 2 is a perspective sketch showing the form of the movable and fixed grip members.
Figure 3:
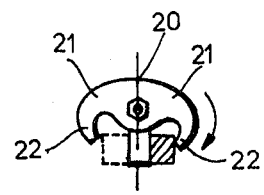
FIG. 3 is an end-on view of the movable and fixed grip members showing the operation of gripping a workpiece.

The mechanical handling device indicated briefly and diagrammatically in FIGS. 1, 2 and 3 comprises a support tube 14 which forms part of a carriage movable back and forth in the radial direction in relation to the centre of the rotary hearth 10 and supported in its movement upon trolley wheels 15.

Rotatably mounted within the support tube 14 is the shaft 16 at the forward end of which is fixed the movable grip member, generally indicated at 17, whilst the fixed grip member, generally indicated at 18, is fixed to the underside of the forward end of the support tube 14. Reference numeral 19 indicates a hydraulically operated actuator for applying rotary motion to the shaft 16 in clockwise and anti-clockwise directions. A suitable hydraulic actuator is supplied by Houdaille Ind. Inc., Hydraulics Division, 537 East Delavan Avenue, Buffalo, N.Y. 14211 under type number 420150LDB.

The movable grip member 17 comprises a substantially flat plate 20 which is fixed to the end of the shaft 16 and has two oppositely directed arms 21, each of which at its end is curved inwardly to form a grip jaw 22 with an inwardly presented grip face. The fixed grip member 18 comprises a bar 23 which is of tapered form in plan view and has two outwardly presented grip faces 24, each of which is in a plane inclined at an oblique angle to the radial centre line 25 for a purpose which will be apparent from a consideration of the plan view of FIG. 1 and the description of operation of the handling device.

As herein mentioned, the rotary hearth 10 indexes with intermittent step-by-step motion in the direction of the arrow 11 and the handling device is connected in such way as to operate automatically in synchronism with the motion of the rotary hearth. From the position of FIG. 1 the support tube of the carriage is about to advance and the rotary grip member has been operated to turn in a direction to grip a cold billet on the one side of the fixed grip member 18 whilst the rotary hearth has indexed to a position in which the gap left in the circle of billets by the previous removal of a hot billet is brought into the position substantially opposite the cold billet held in the grip devices.

Operating automatically, the carriage advances to bring the cold billet into the position indicated in dotted lines on the rotary hearth whereupon the mechanism operates to rotate the shaft 16 in the reverse direction, thus releasing the cold billet and at the same time bringing the other grip face of the movable grip member into engagement with the preceding hot billet which is thus gripped and upon return movement of the carriage this hot billet is removed from the furnace and subsequently unloaded at the end of the return movement when the shaft 16 is again rotated. Thus, the handling device continues to operate automatically by placing a cold billet in position and removing a hot billet on every operative forwards and rearwards stroke.

Figure 4:
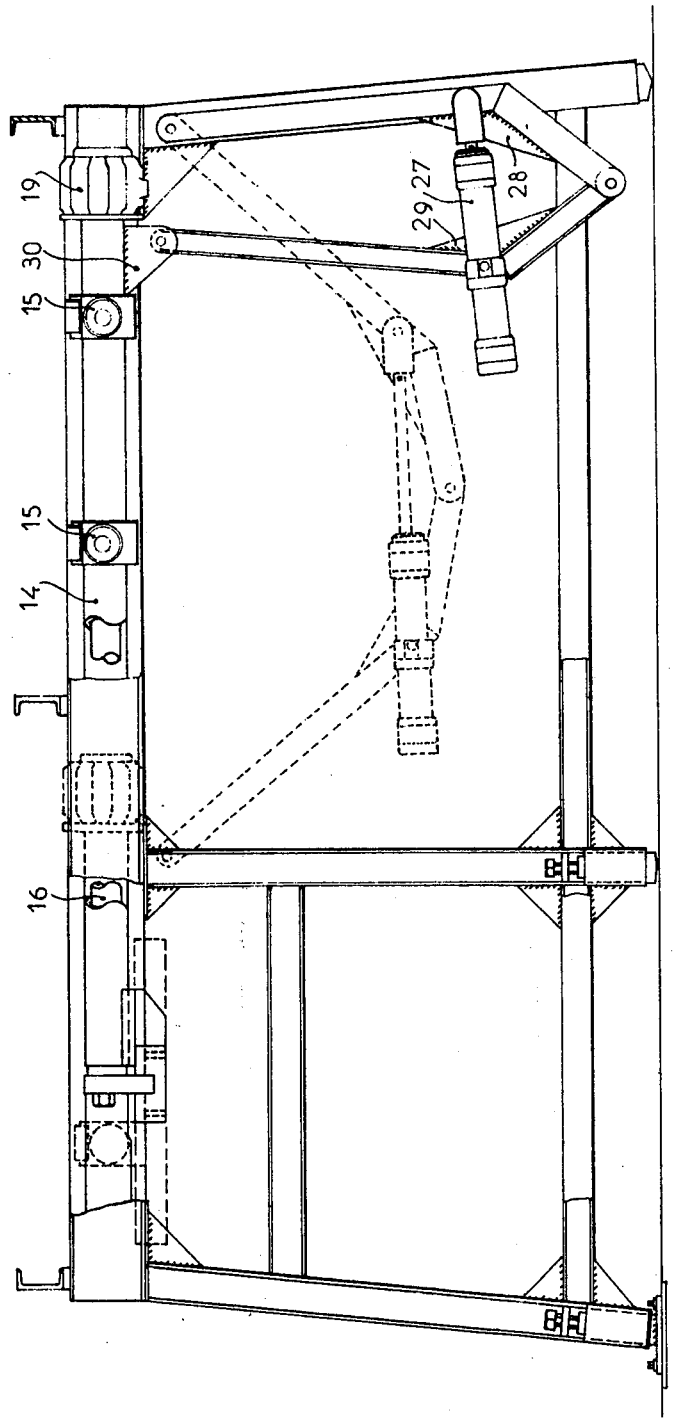
FIG. 4 is a view in side elevation of a practical form of machine embodying the invention and FIG. 5 is an end-on view of this machine.
Figure 5:
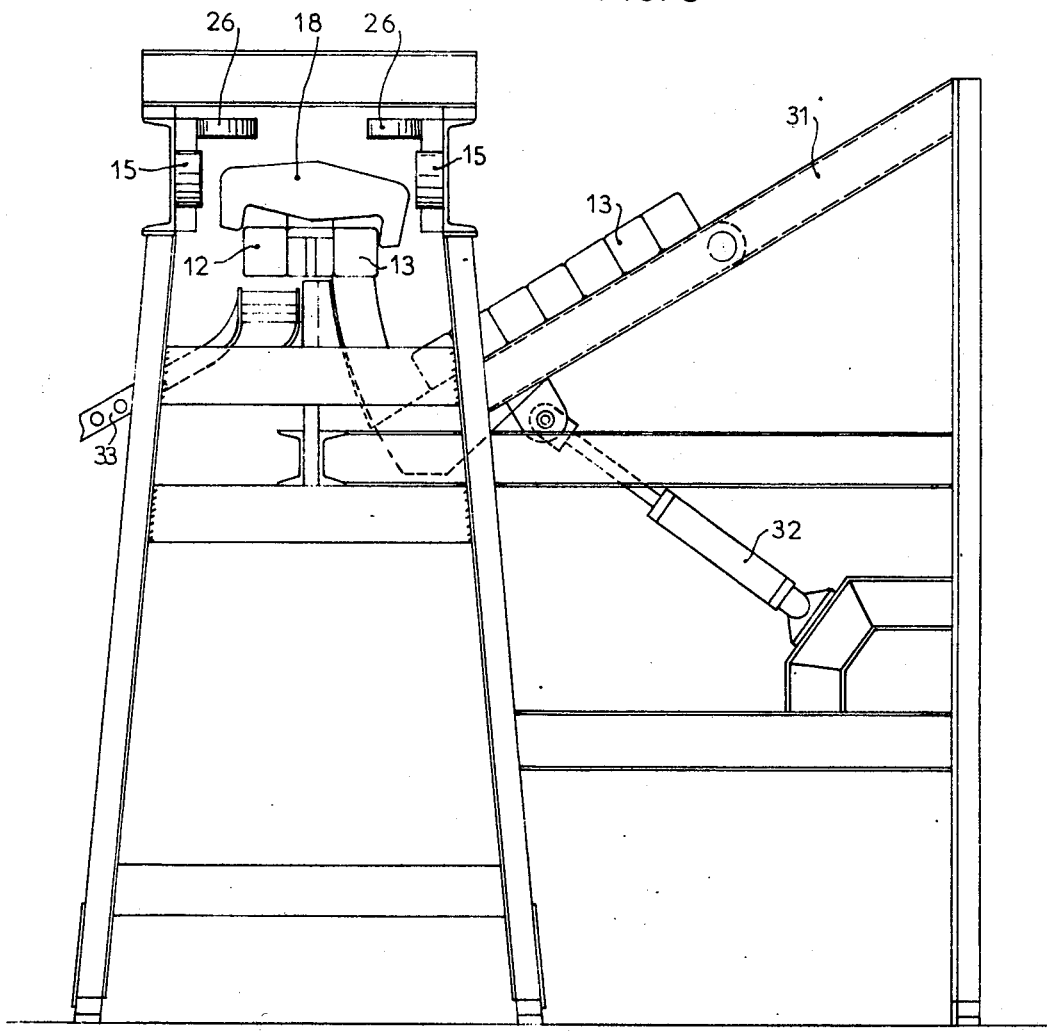

Brief reference is now made to FIGS. 4 and 5 which illustrate a practical version of the handling device and the same reference numerals are used in FIGS. 4 and 5 as used in FIGS. 1 to 3 to indicate the essential feature of the device.

In addition to the rollers 15 the carriage which supports the support tube 14 is also provided with rollers 26 rotating about vertical axes to ensure stability of the carriage in the transverse direction during its backwards movement.

The mechanism for reciprocating the support tube is housed in the space below the support tube and within the confines of the legs of the supporting frame and comprises a hydraulic cylinder 27 pivotally connected at one end to the one arm of a bell crank lever 28 which is pivotally connected to the frame and at the other end to a further bell crank lever 29 which is pivotally connected to a lug 30 on the underside of the carriage. The retracted position and the extended position of this operating mechanism are shown in full lines and dotted lines respectively in FIG. 4.

As shown in FIG. 5 there is, on one side of the machine, a loading ramp 31 for the cold billets 13 with a platform operated by a hydraulic ram 32 to raise a fresh cold billet up to the level of the grip device to enable the cold billet to be gripped, as shown in FIG. 5, whilst a hot billet 12 is simultaneously released from the grip device to drop down on to a roller track 33 on which it is carried away to the next forging operation.

In the example above described the mechanical handling device of the invention is on a stationary frame and the indexing motion is performed by the plant (the rotary hearth) which is treating the workpieces. However, as an example of another mode of use of the invention, the frame may be movable in relation to the plant and may index in a linear path past a number of stations of a machine at each one of which the device operates to load in a fresh workpiece and take out a treated workpiece. Thus it will be understood that the invention is capable of wide application within the scope of the broad definition given hereinbefore.

What we claim is:
1. A mechanical handling device comprising:
a fixed framework,
a carriage mounted for linear reciprocatory movement upon said framework between a loading station and an unloading station,
a support tube mounted upon said carriage,
a stationary grip member mounted on the support tube at one end thereof, and two independent grip faces provided on said stationary grip member,
a shaft rotatably mounted within said support tube,
a movable grip member mounted on said shaft, the movable grip member having two independent grip faces so that there are two pairs of cooperating grip faces with a stationary grip face and a movable grip face in each pair,
actuating means for effecting angular movement of the shaft relative to the support tube for bringing either one of said pairs of grip faces into operation while the other pair of grip faces is non-operative.
2. A mechanical handling device according to claim 1 wherein
The movable grip member comprises two arms extending in opposite directions generally at right angles to the axis of the shaft,
A jaw member having an inwardly presented grip face is provided at the end of each arm,
The fixed grip member comprises a bar like member fixed to the front end of the support tube and projecting forwardly with its axis on the medial line between the two grip faces of the movable grip member,
The side faces of such bar like member constitute grip faces and are presented outwardly in a direction towards the face at the ends of the two arms.
3. A mechanical handling device according to claim 2 wherein the bar-like member is tapered in plan view and the side faces thereof converge forwardly of the unloading station.

* * * * *